Figure 5:
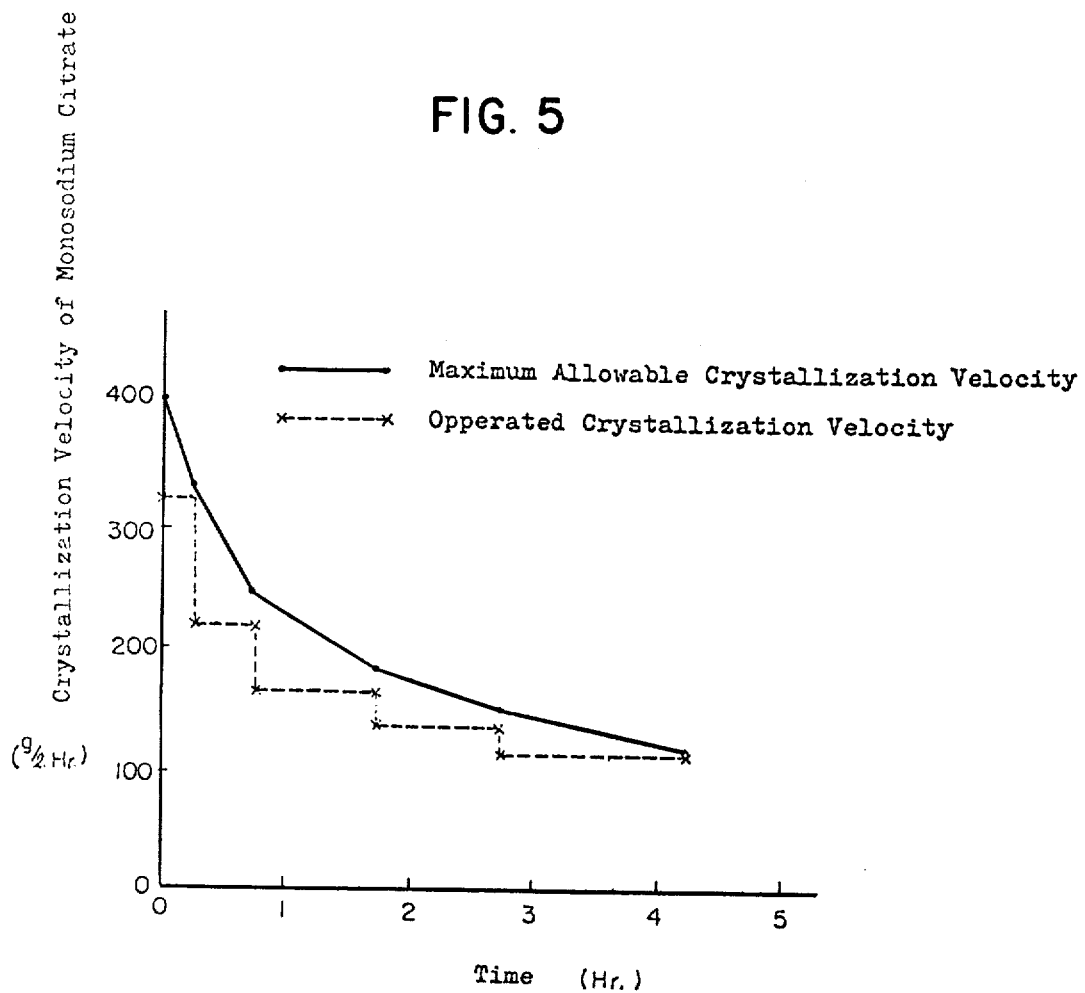

United States Patent [19]

Nara et al.

[11] 3,925,465
[45] Dec. 9, 1975

[54] CRYSTALLIZATION OF ALPHA MONOSODIUM CITRATE MONOHYDRATE

[75] Inventors: Kiyoshi Nara, Kyoto; Kazuyoshi Katamoto, Osaka; Kazuhiko Ohta, Osaka; Hideo Fukuda, Osaka, all of Japan

[73] Assignee: Takeda Chemical Industries, Ltd., Japan

[22] Filed: Apr. 25, 1974

[21] Appl. No.: 464,614

[30] Foreign Application Priority Data
May 26, 1973 Japan.............................. 48-47890
Dec. 7, 1973 Japan.............................. 48-137112

[52] U.S. Cl. ........................................... 260/535 P
[51] Int. Cl.² ........................................ C07C 59/16
[58] Field of Search................................ 260/535 P

[56] References Cited
FOREIGN PATENTS OR APPLICATIONS
2,029,689 10/1970 France............................ 260/535 P
2,028,886 10/1970 France............................ 260/535 P
1,571,551 5/1969 France............................ 260/535 P
1,596,056 7/1970 France............................ 260/535 P
20,395 6/1972 Japan............................. 260/535 P

OTHER PUBLICATIONS

Burns, D. M. et al., Acta Crystallographica, Vol. 7, pp. 137–138, 1954.
Groth, P. Chemische Krystallographic, Vol. III, pp. 465 and 477.

*Primary Examiner*—James A. Patten
*Assistant Examiner*—Killos
*Attorney, Agent, or Firm*—Wenderoth, Lind & Ponack

[57] ABSTRACT

Monosodium citrate monohydrate crystals are prepared by evaporating an aqueous solution containing monosodium citrate whilst maintaining said solution between 20°C and 60°C and at a concentration of monosodium citrate of not less than 155 % (W/V) of saturation solubility of γ-crystals of monosodium citrate. Thus obtained crystals have a good filtrability and separability from a solution and are widely applicable as foods, pharmaceuticals and chemical products.

4 Claims, 5 Drawing Figures

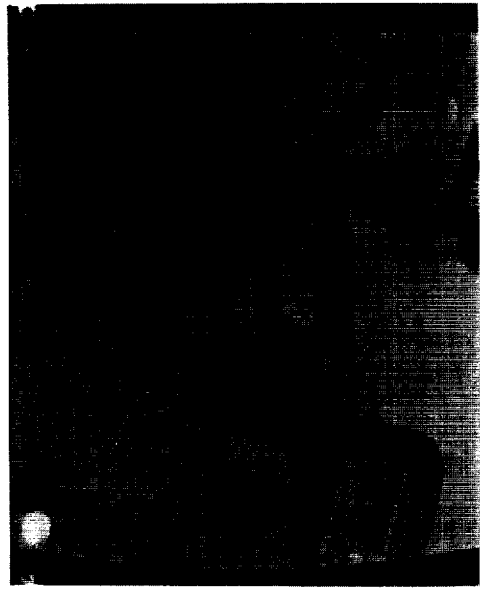
FIG. 1                FIG. 2
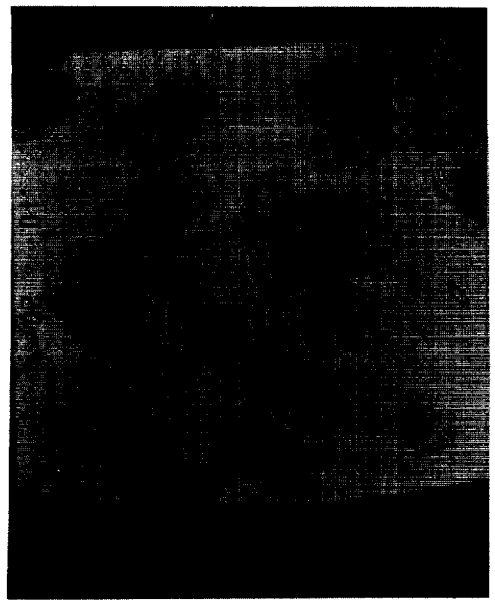
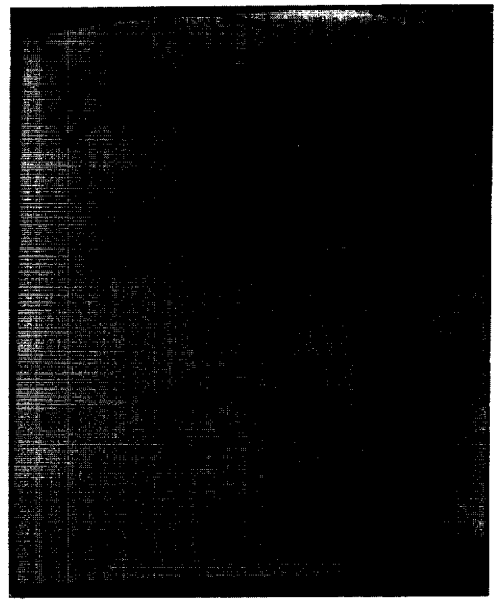
FIG. 3                FIG. 4

CRYSTALLIZATION OF ALPHA MONOSODIUM CITRATE MONOHYDRATE

This invention relates to large-sized crystals of monosodium citrate monohydrate and preparation thereof from an aqueous solution containing monosodium citrate, said crystals being separable with efficiency from the solution.

Monosodium citrate is a compound which, either as it is or in the form of free citric acid, finds application in the fields of foodstuffs, pharmaceuticals and chemical products. Though a method for producing citric acid by means of yeasts has recently been developed (e.g. French Pat. Nos. 1,571,551, 1,596,056 and 7,002,162), the method inevitably gives rise to some amounts of (+) isocitric acid and other organic acids as contaminants even if cultural conditions and other factors are carefully controlled. Several attempts have been made to recover monosodium citrate or citric acid from such solutions containing (+) isocitric acid and other impurities. One of the proposed procedures comprises, as it is the case with the conventional treatment of culture broths of filamentous fungi, converting the citric acid in the broth to calcium citrate, adding sulfuric acid so as to decompose the calcium citrate to citric acid and calcium sulfate, concentrating this citric acid solution to cause the citric acid to separate as crystals and recovering the crystals from the solution (Japanese Pat. Publication No. 20395/1972).

Another method comprises adding sodium hydroxide, for instance, to the culture broth, concentrating the broth to let trisodium citrate separate as crystal, collecting the crystals, subjecting them to an ion exchange treatment or electrodialysis, for instance, to remove the sodium and harvesting the resultant citric acid.

However, the method involving the intermediate formation of calcium citrate has not a few disadvantages, among which are the difficulties incidental to the handling and treatment of solids such as calcium citrate and byproduct calcium sulfate. The method via trisodium citrate also has many disadvantages. For example, the method of necessity involves the addition of a large amount of sodium to the culture broth and, to remove the sodium, fairly large-scale equipment is required.

In view of the foregoing disadvantages of prior art, the present inventors made an extensive study to develop a commercially advantageous method of recovering monosodium citrate from a fermentation broth, which method should require addition of only a minimum amount of sodium to the broth and, accordingly, should enable us to separate and recover the desired product in the form of monosodium citrate which is comparatively ready to release the sodium. Thus, for example, the present inventors tentatively adjusted a fermentation broth containing both citric acid or/and (+) isocitric acid to pH about 3.0 – 4.0 with an acid such as hydrochloric acid or sulfuric acid or with an alkali such as sodium hydroxide or sodium carbonate, separated the cells from the broth and concentrated the filtrate in the routine manner to cause crystals of citric acid to separate. In so doing, the present inventors discovered that depending upon the concentration temperature employed, at least four different types of crystals are produced. By way of example, if an aqueous solution of monosodium citrate is concentrated and crystallized at 65°C, there will be obtained small anhydrous hexagonal platelets (hereafter called γ-crystals). At 55°C, the formation of γ-crystals is accompanied by the separation of large hexagonal plates (hereafter called β-crystals) and large prisms (hereafter called α-crystals). Both the α- and β-crystals are monosodium citrate monohydrate.

When a similar aqueous solution of monosodium citrate is concentrated at 40°C and rapidly cooled to 10°C – 20°C, small anhydrous cubic crystals (hereafter called δ-crystals) separate. These different crystals are shown in FIGS. 1 to 4. Thus, FIGS. 1, 2, 3 and 4 are microphotographs showing the α-, β-, γ- and δ-crystals, respectively. The microphotograph of FIG. 1 is of 30 times magnification, and the microphotographs of FIGS. 2, 3 and 4 are of 60 times magnification.) These crystals have following unique X-ray diffraction characteristics at $\lambda=1.542$ A (Cu $K_\alpha$ -line, 40 KV, 80 mA, Ni-filter).

| (α-crystals) Spacing dA | Relative intensities | (β-crystals) Spacing dA | Relative intensities |
|---|---|---|---|
| 7.8 | s | 7.0 | s |
| 6.4 | m | 5.9 | vw |
| 5.4 | m | 5.4 | vw |
| 4.1 | w | 5.3 | w |
| 4.0 | w | 5.2 | m |
| 3.89 | vs | 4.5 | vw |
| 3.79 | vw | 4.3 | w |
| 3.71 | m | 4.2 | w |
| 3.58 | w | 3.66 | w |
| 3.49 | m | 3.54 | m |
| 3.35 | w | 3.42 | w |
| 3.30 | w | 3.13 | w |
| 3.25 | vw | 3.10 | vw |
| 3.18 | m | 3.04 | m |
| 2.92 | w | 2.97 | vw |
| 2.77 | vw | 2.93 | w |
| 2.70 | w | 2.88 | w |
| 2.60 | w | 2.71 | w |
| 2.55 | w | 2.64 | w |
| 2.45 | vw | 2.30 | w |
| 2.42 | m | | |
| 2.36 | vw | | |
| 2.34 | w | | |
| 2.29 | w | | |

| (γ-crystals) Spacing d | Relative intensities | (δ-crystals) Spacing d | Relative intensities |
|---|---|---|---|
| 6.8 | vw b | 7.3 | vs |
| 5.1 | m | 5.8 | m |
| 4.2 | w | 5.0 | m |
| 3.87 | m | 4.7 | m |
| 3.74 | vw | 4.6 | m |
| 3.61 | vw | 4.4 | vw |
| 3.46 | m | 3.65 | m |
| 3.36 | m | 3.60 | m |
| 3.10 | w | 3.55 | m |
| 2.94 | vw | 3.46 | w |
| 2.87 | vw | 3.38 | w |
| 2.73 | vw | 3.08 | m |
| 2.70 | vw | 2.95 | vw |
| 2.54 | vw | 2.93 | vw |
| 2.49 | w | 2.80 | w |
| 2.41 | m | 2.71 | w |
| 2.37 | vw | 2.68 | m |
| 2.35 | w | 2.56 | vw |
| | | 2.41 | vw |
| | | 2.37 | w |
| | | 2.30 | w |

Note:
vw=very weak,
w=weak,
m=medium,
s=strong,
vs=very strong,
b=broad

The present inventors further made a research to develop a method for selective separation of α-crystals which are the easiest to separate from solutions and the easiest to deal with on a commercial scale of all the above-mentioned types of crystals.

The γ-crystals of monosodium citrate are more stable than any of said α-, β- and δ-crystals and, if allowed to stand as they are, the α-, β- and δ-crystals will spontaneously convert themselves to γ-crystals. That means the difficulty to isolate α-crystals alone despite the above finding. As it was, the present inventors discovered surprisingly that if the crystallization is performed within the temperature range of 20°C to 60°C and whilst the degree of oversaturation of the solution is controlled at no less than 155 percent of the saturation solubility (weight/volume) of γ-crystals of monosodium citrate at 20° to 60°C. there will be formed crystals which are almost exclusively α-crystals. The fact is surprising, indeed, because it is more reasonable to expect that oversaturation is conducive to the formation of γ-crystals which are the most stable of all. The above finding was followed by further research, which has resulted in this invention.

Thus, the first object of this invention is to provide crystals of monosodium citrate monohydrate, especially α-crysals, which is separable with efficiency from the solution.

The second object of this invention is to provide a process for selective crystallization of monosodium citrate monohydrate. The third object is to separate citrate from (+) isocitrate.

Further objects of this invention will be illustrated in the following description.

These objects are realized by causing monosodium citrate monohydrate crystals to separate from an aqueous solution of monosodium citrate at a temperature of 20°C to 60°C whilst the concentration of monosodium citrate is maintained at 155 percent of the saturation solubility (weight/volume) of monosodium citrate γ-crystals at that temperature.

The starting material for the method of this invention is an aqueous solution containing monosodium citrate. Such an aqueous solution can be obtained, for example by the following procedure. Thus, as described in French Pat. No. 7003025, a cell-free extract obtained from a culture broth of a bacterium, e.g. a strain of the genus *Corynebacterium*, is adjusted with sodium-containing-alkali or an acid such as sulfuric acid or hydrochloric acid in such a manner that the solution will contain at least one mole of sodium ion relative to dissolved citric acid and the pH of the solution be about 3.0 to 4.0, and, preferably, about 3.4 to 3.6 (in this pH range, citrate ion and sodium alkali occur in substantially equimolar proportions in the solution).

In the above aqueous solution, the monosodium citrate may occur either as it is or as dissociated into ions, or further in such forms as free acid and, partially, disodium salt. However, as long as there is substantially one molecular equivalent of sodium ion for every mole of citric acid, the solution can be employed as the starting material according to this invention.

In the method of this invention, monosodium citrate is caused to separate from an aqueous solution of monosodium citrate by concentrating the solution at a temperature in the range of 20° to 60°C (whilst the rate of crystallization is controlled in such a way that the concentration of monosodium citrate in the solution will be no less than 155 percent and, preferably 155 to 300 percent, of the saturation solubility (weight/volume) of monosodium citrate γ-crystals.

The above suitable degree of oversaturation and temperature conditions were determined from the results of Experiment I which will be described below.

EXPERIMENT I

While an aqueous solution of monosodium citrate was maintained at a constant temperature, α-crystals of monosodium citrate were added as seed. Portions of the seeded solution were concentrated so that crystals would separate at different degrees of oversaturation, and the morphology of each of the resultant crystalline products was investigated. The results are shown below.

Table 1

Relation of crystallization conditions with crystal forms of monosodium citrate

| | | The degree of oversaturation of monosodium citrate (γ-crystals)(%) | | | | | | | |
|---|---|---|---|---|---|---|---|---|---|
| | | 100 | 120 | 150 | 155 | 180 | 200 | 250 | 300 | 350 |
| Crystallization temperature (°C) | 20 | γ | γ | γ | α | α | α | αδ | αδ | δ |
| | 30 | γ | γ | γ | α | α | α | α | αδ | δ |
| | 40 | γ | γ | γ | α | α | α | αγ | γ | γ |
| | 50 | γ | γ | γ | α | α | αβγ | βγ | γ | γ |
| | 60 | γ | γ | γ | α | αβγ | βγ | γ | γ | γ |
| | 70 | γ | γ | γ | γ | γ | γ | γ | γ | γ |

The relation of the degree of saturation solubility (g/l, W/V) of monosodium citrate (γ-crystals) with temperature is shown in Table 2.

Table 2

Relation of the degree of saturation solubility (g/l, W/V) of monosodium citrate (γ-crystals) with temperature

| Temperature (°C) | Saturation Solubility (g/l, W/V) of Monosodium Citrate (γ-crystals) |
|---|---|
| 10 | 150 |
| 20 | 180 |
| 30 | 220 |
| 40 | 275 |
| 45 | 305 |
| 50 | 330 |
| 60 | 388 |

It will be apparent from Table 1 that large prisms (α-crystals) separate selectively when the degree of oversaturation of monosodium citrate solution is not less than 155 percent and the crystallization temperature is optionally selected from between 20°C and 60°C.

The specific procedures for controlling the degree of oversaturation of such monosodium citrate solution may for example be as follows.

Thus, in the case of continuous crystallization, the degree of oversaturation can be controlled by adjusting such variables as the concentration velocity, stock solution feed and the rate of slurry withdrawal. In a batch process, the necessary control can be obtained by adjusting the concentration velocity. For this purpose, it is important to monitor the concentration of monosodium citrate in the solution and keep watching the morphology of the crystals being formed.

While, normally, the crystallization temperature ought to be as high as possible in order that the crystallization may be performed commercially with advantage, it is necessary that the temperature be not higher than 60°C. Over 60°C, as the solution is progressively concentrated, it becomes more like slurry to render solid-liquid separation increasingly difficult. Particularly desirable are temperatures not exceeding 50°C and not than the temperatue threshold below which the operation can no longer be performed commercially with advantage, for example 20°C.

Thus, the optimum temperature is optionally elected from between about 30° and 50°C.

In the practice of the process of this invention, use is also made, as the starting material, of an aqueous solution containing monosodium (+) isocitrate besides monosodium citrate, the solution being obtainable, for instance, by cultivating a strain of the genus Candida in accordance with the process as described in French Patent 7,002,162. It was found by the present inventors in the course of their study, however, that the presence of monosodium (+) isocitrate (or (+) isocitric acid) adveasely affects the formation of the objective monosodium citrate monohydrate crystals (α-crystals) and even under the afore-mentioned optimum crystallization conditions for crystallization of monosodium citrate monohydrate undesirable γ- or δ-crystals are concomitantly formed. Thus, in order to examine the influence of monosodium (+) isocitrate, following Experiment II was conducted.

EXPERIMENT II

Mixtures of various proportions of monosodium (+) isocitrate with a solution of monosodium citrate (165 % oversaturation, W/V) were each concentrated at 45°C (saturation solubility of γ-crystals of monosodium citrate: 305 g/l.) and, after the addition of prisms (α-crystals) of monosodium citrate as seed crystals, each mixture was further concentrated and the configurations of emerging crystals were examined. The results are shown in Table 3.

Table 3

| Experiment No. | Monosodium citrate in solution g/l. | Monosodium (+) isocitrate in solution g/l. | Configuration of monosodium citrate crystals |
|---|---|---|---|
| 1 | 500 | 0 | α-crystals |

Table 3-continued

| Experiment No. | Monosodium citrate in solution g/l. | Monosodium (+) isocitrate in solution g/l. | Configuration of monosodium citrate crystals |
|---|---|---|---|
| 2 | 500 | 25 | α-crystals |
| 3 | 500 | 50 | α- and β-crystals |
| 4 | 500 | 100 | β-crystals |
| 5 | 500 | 250 | β- and γ-crystals |
| 6 | 500 | 500 | β- and δ-crystals |
| 7 | 500 | 750 | δ-crystals |

As will be apparent from the above table, the crystal configuration of monosodium citrate changes with increases in the concentration of monosodium (+) isocitrate.

However, the further research led the present inventors to the finding that by properly controlling the crystallization speed of monosodium citrate according to the concentration of co-present monosodium (+) isocitrate, α-crystals of monosodium citrate can be isolated with success even from the monosodium (+) isocitrate-containing solution.

The suitable crystallization velocity has been determined by the following Experiment III.

EXPERIMENT III

While the concentration of monosodium (+) isocitrate is held constant and the oversaturation rate of monosodium citrate is kept at not less than 155% and with the addition of α-crystals of monosodium citrate as seed crystals, test solutions were concentrated whilst their temperatures were maintained at temperatures not exceeding 50°C so that monosodium citrate would separate at various crystallization velocities and the configurations and separability-filtrability characteristics of the resulting crystals were studied. The results are given below.

Table 4

| Crystallization velocity of monosodium citrate g/l. Hr. | 25 | 50 | 75 | 100 | 150 | 200 | 300 | 400 | 600 |
|---|---|---|---|---|---|---|---|---|---|
| Concentration of monosodium (+) isocitrate in crystallization slurry | | | | | | | | | |
| 0 g/l. | 0 | 0 | 0 | 0 | 0 | 0 | 0 | 0 | 0 |
| 50 | 0 | 0 | 0 | 0 | 0 | 0 | 0 | 0 | x |
| 100 | 0 | 0 | 0 | 0 | 0 | x | x | x | |
| 150 | 0 | 0 | 0 | x | x | x | | | |
| 200 | 0 | 0 | x | x | | | | | |
| 250 | 0 | x | x | | | | | | |

In the table, the circle 0 denotes the emergence of predominantly prism-shaped crystals (α-crystals) of good separability and filtrability and the cross x means the emergence of predominantly platelets (γ-crystals) or cubes of (δ-crystals) of inferior separability and filtrability.

It will be seen from the above table that, even when the concentration of monosodium (+) isocitrate has increased, there can be obtained α-crystals of good separability and filtrability by reducing the velocity of crystallization of monosodium citrate.

The relation of the concentration of monosodium (+) isocitrate in the crystallization system with the highest crystallization velocity of monosodium citrate which is conducive to α-crystals is substantially linear as the two variables are plotted on logarithmic axes and the approximate equation of this straight line will be:

$$Y = 219000X^{-1.53} \qquad (1)$$

wherein
- Y : the maximum allowable crystallization velocity of monosodium citrate (g/l.—Hr)
- X : the concentration of monosodium (+) isocitrate in the crystallization slurry.

Thus, in order to isolate α-crystals of monosodium citrate monohydrate from an aqueous solution containing both monosodium citrate and monosodium (+) isocitrate, it is necessary, besides adhering to the foregoing crystallization conditions, to control the crystallization velocity of monosodium citrate (g/l.—Hr) below maximum allowable crystallization velocity Y as determined from the equation (1).

The resultant crystals of monosodium citrate monohydrate can be recovered from the aqueous solution by routine separatory procedures such as centrifugation or filtration.

Separability of α-crystals from the solution and their size distribution are demonstrated in the following Experiment IV.

EXPERIMENT IV

Thus formed α- and γ-crystals are recovered as wet crystals by glass-filtration. The amount of adherent water (% W/W) and the distribution of size of the crystals are as follows:

Table 5

| | α-crystals | γ-crystals |
|---|---|---|
| water amount (% W/W) | 3.8 | 24.6 % |
| article size distribution (% W/W) | | |
| above 590 μ | 14.4 | 0 |
| 420 – 590 μ | 10.8 | 5.9 |
| 210 – 420 μ | 38.2 | 14.4 |
| 105 – 210 μ | 24.7 | 31.0 |
| 44 – 105 μ | 10.8 | 35.2 |
| below 44 μ | 1.1 | 13.5 |
| | 100 % | 100 % |

This result shows that α-crystals are larger on average and more easily separable from water than γ-crystals.

EXAMPLE 1

By the procedure described in the specification of French Pat. No. 7,003,025, *Corynebacterium* sp.416(IFO-12729) (ATCC-21459) is cultivated at 32°C for 64 hours in a 200—liter fermentation tank containing 100 liters of a culture medium (pH 7.0) which is composed of 4 % of a petroleum fraction containing 92 % of n-paraffins of 10 to 12 carbon atoms, 0.2 % of $KH_2PO_4$, 0.05 % of $MgSO_4.7H_2O$, 0.002 % of $MnSO_4.7H_2O$, 0.02 % of $FeSO_4.7H_2O$, 0.4 % of $NH_4Cl$, 0.1 % of yeast extract and 0.1 % of $CaCO_3$, while the pH of the medium is maintained at 6.5 with NaOH. The procedure yields 41.4 mg. of citric acid as accumulated per milliliter of the culture broth.

The broth, amounting to 100 liters, is filtered by means of a filter press precoated with a filter aid to harvest 95 liters of a filtrate. To the filtrate is added Amberlite 200 C (H-form), a strongly acid cation exchange resin by Rohm and Haas Company, U.S.A., to lower the pH to 3.5. After the resin has been removed, 50 grams of activated carbon is added, followed by filtration. The carbon is washed and the washing is added to the filtrate. Thus-obtained decolorized clear solution, amounting to 105 liters (41.7 mg./ml. monosodium citrate), is concentrated at 50°C and under reduced pressure to obtain 7.5 liters of a concentrate (an oversaturated solution corresponding to 177 % of 330 mg./ml. which is the saturation solubility of monosodium citrate γ-crystals at 50°C).

Then, the solution is seeded with 30 grams of monosodium citrate monohydrate prisms (α-crystals) and agitated gently at a constant temperature of 50°C, whereupon α-crystals start separating.

The crystals are examined from time to time and, as soon as evidence of small hexagonal platelets, which are γ-crystals, are detected, the system is centrifuged to recover the crystals from the solution. These crystals, weighing a total of 600 grams, are found to be α-crystals from their X-ray diffraction pattern and microphotograph.

EXAMPLE 2

Using citric acid or sodium hydroxide, 4 liters of a 25.5 % aqueous solution of monosodium citrate is adjusted to pH 3.5.

Then, the solution is concentrated at 50°C under reduced pressure to 1.72 liters (an oversaturated solution corresponding to 180 % of 330 mg./ml. which is the saturation solubility of monosodium citrate γ-crystals at 50°C). The solution is seeded with 5 grams of α-crystals of monosodium citrate and, while it is maintained at 50°C, the system is gently stirred, whereupon α-crystals start separating. The crystals are examined at timed intervals and, when evidences of small hexagonal platelets or γ-crystals are detected, the solution is centrifuged to recover the crystals.

These crystals, weighing a total of 120 grams, are found to be α-crystals from their X-ray diffraction pattern and microphotograph.

Similarly, 4 liters of a 25.5 % aqueous solution of monosodium citrate is adjusted to pH 3.5 and concentrated at 50°C under reduced pressure to 2.2 liters (140 % oversaturation at 50°C) and, then, seeded with 5 grams of prisms (α-crystals) of monosodium citrate monohydrate. The system is gently agitated at a constant temperature of 50°C, whereupon γ-crystals alone separate. No α-crystals are obtained.

EXAMPLE 3

Four liters of a 25.5 % aqueous solution of monosodium citrate is adjusted to pH 3.5 and concentrated at 50°C under reduced pressure to 2.2 liters (an oversaturated solution corresponding to 210 % of 220 mg./ml. which is the saturation solubility of monosodium citrate at 30°C). After cooling to 30°C, the solution is seeded with 5 grams of α-crystals of monosodium citrate and the system is gently stirred at a constant temperature of 30°C, whereupon large prisms, which are α-crystals, start separating. The crystals are observed at timed intervals and, when evidences of small hexagonal platelets, which are γ-crystals, have just been detected, the system is centrifuged to recover the crystals. These crystals, weighing a total of 260 grams, are found to be α-crystals from their X-ray diffraction pattern and microphotograph.

Similarly, 4 liters of a 25.5 % aqueous solution of monosodium citrate is adjusted to pH 3.5 and concentrated to 1.5 liter (309 % oversaturation at 30°C). In these instances, δ-crystals are ready to separate and, even if α-crystals are obtained, they are extremely small-sized. On the other hand, when the solution is concentrated only to 3.3 liters (140 % over saturation at 30°C), γ-crystals separate.

EXAMPLE 4

To a crystallization vessel containing 1 liter of an aqueous solution containing 530 g. of monosodium citrate are added 5 grams of α-crystals of monosodium citrate as seed. While feeding the same solution to the vessel at the rate of 800 ml./hr., the vacuum concentration-crystallization is continued at 40°–50°C whilst the rate of evaporation is controlled at 760 ml./hr.

After 1 hour, the concentration is suspended and the resultant crystals are recovered by filtration, rinsed with a small amount of water and dried. The procedure yields 440 grams of prisms of monosodium citrate. These crystals are found to be α-crystals from their X-ray diffraction pattern and microphotograph.

EXAMPLE 5

In a culture medium containing 8 % of n-hexadecane, 0.5 % of $(NH_4)_2SO_4$, 0.05 % of $MgSO_4.7H_2O$, 0.025 % of $KH_2PO_4$, 50 γ/l. of thiamine hydrochloride and 0.1 % of antifoam, Candida lipolytica (IFO-1566) (ATCC 20,324) was cultivated at 28°C for 72 hours whilst the pH of the broth was maintained at 3.5 using a solution of sodium hydroxide as a pH modifier. One-hundred liters of the cell-free broth obtained in the above manner, which contained 80 g./l. of monosodium citrate and 5 g./l. of monosodium (+) isocitrate, were concentrated to obtain 15 l. of a concentrated solution (pH 3.4) containing 533 g./l. of monosodium citrate (165 % oversaturation at 45°C) and 33 g./l. of monosodium (+) isocitrate.

One liter of the concentrated solution prepared above was seeded with 5 grams of prism-shaped crystals of monosodium citrate as seed crystals and the vacuum concentration and crystallization was carried out at 40°–50°C whilst feeding the same solution to the crystallization system at a rate of 800 ml./hr. and the rate of evaporation was controlled at 760 ml./hr. Under the above conditions, the crystallization velocity of monosodium citrate was 426 g./l.-hr. The critical concentration of monosodium (+) isocitrate which enabled prisms of monosodium citrate to separate out of the solution at the above crystallization velocity was 62.7 g./l. according to equation (1). Accordingly, the concentration was suspended after 1.13 hour, by which time the concentration of monosodium (+) isocitrate in the crystallization mother liquor was 62.7 g./l. [(62.7−33) ÷ (33 × 0.8) = 1.13]. The resultant crystals were harvested by filtration, washed with a small amount of water and dried. The procedure yielded 500 g. of monosodium citrate prism-shaped crystals. Analysis of these crystals: monosodium citrate 92.0 % (α-crystal); monosodium (+) isocitrate 0.05 %; water 7.7 %.

The mother liquor, whose pH was 3.2, comprised, per liter, 553 g. of monosodium citrate and 64 g. of monosodium (+) isocitrate.

As a control, vacuum concentration was carried out for 1.5 hour under the same conditions. In this case, substantial amounts of platelets found their way into the crop of crystals, which did not lend itself well to filtration. The analysis of the crystals was: 89.3 % of monosodium citrate and 1.6 % of monosodium (+) isocitrate.

EXAMPLE 6

The mother liquor obtained in Example 5 (165 % over-saturation rate at 45°C) was decolorized by the addition of 10 g. of carbon powder and one liter portion of the solution was adjusted to pH 3.6 with an aqueous solution of sodium hydroxide. To this solution were added 5 g. of seed crystals and the vacuum evaporation and crystallization was continued at 40°–50°C whilst the same mother liquor as above was continuously fed to the crystallization system. The amount of feed of mother liquor and the rate of evaporation were controlled in the following manner.

Table 6

| Time (hour) | Rate of feed of mother liquor | Rate of evaporation | Crystallization velocity of monosodium citrate |
|---|---|---|---|
| 0 – ¼ | 600 ml./hr. | 575 ml./hr. | 320 g./l.-hr. |
| ¼ – ¾ | 400 | 480 | 213 |
| ¾ – 1¾ | 300 | 290 | 160 |
| 1¾ – 2¾ | 250 | 240 | 133 |
| 2¾ – 4¼ | 200 | 190 | 108 |

The relation of the crystallization velocity of monosodium citrate under these conditions and the maximum allowable crystallization velocity which is conductive to the production of prisms-shaped crystals as determined from the concentration of monosodium (+) isocitrate in the crystallization system is diagrammatically shown in FIG. 5. After the crystallization, the crystals were harvested by filtration to obtain 738 g. of monosodium citrate prisms. Analysis of these crystals was: 91.9 % monosodium citrate, 0.4 % monosodium (+) isocitrate and 7.6 % water. The mother liquor (pH 3.7) contained, per liter, 549 g. of monosodium citrate and 144 g. of monosodium (+) isocitrate.

EXAMPLE 7

To 1 l. of the mother liquor obtained in Example 6 (165 % oversaturation rate at 45°C) were added 5 g. of α-crystals of monosodium citrate as seed crystals and the crystallization was carried out gradually under cooling in such a manner that the crystallization velocity of monosodium citrate did not exceed the maximum allowable crystallization velocity of 115 g./l.-hr. The crystals formed were harvested by filtration to obtain 410 g. of monosodium citrate prism-shaped crystals. Analysis of these crystals was: 92.1 % of monosodium citrate (α-crystals), 0.9 % of monosodium (+) isocitrate and 6.0 % of water. The mother liquor (pH 3.9) contained, per liter, 205 g. of monosodium citrate and 140 g. of monosodium isocitrate. The yield of monosodium citrate (α-crystals) from the concentrated solution to this stage was 88.5 %.

EXAMPLE 8

A crystallization tank was filled with 30 l. of the mother liquor obtained in the same manner as Example 5 and with the addition of 50 g. of seed crystals, the vacuum evaporation and crystallization was continued (rate of evaporation: 16.5 l./hr.) whilst the concentrated solution of Example 5 was fed at a rate of 30 l./hr. and the crystal slurry was withdrawn at a rate of 17 l./hr. (12.2 l./hr. as the crystallization mother liquor).

The crystallization velocity of monosodium citrate in this state was 330 g./l.-hr. and the concentration of monosodium isocitrate in the mother liquor was constant at 64 g./l. (The maximum allowable crystallization velocity at this concentration level of monosodium isocitrate as determined by equation (1) was 405 g./l.-hr.)

The vacuum evaporation and crystallization was continued for 3 hours and the crystals that had separated out were harvested by filtration. The procedure yielded 31.8 kg. of prism-shaped crystals of good separability and filtrability.

What we claim is:

1. Prism-shaped crystals of monosodium citrate monohydrate which have the following X-ray diffraction characteristics at $\lambda=1.542$ using a $CuK_\alpha$-line, 40 KV, 80 mA and Ni-filter:

| Spacing d (Å) | Relative intensities |
|---|---|
| 7.8 | Strong |
| 6.4 | Medium |
| 5.4 | Medium |
| 4.1 | Weak |
| 4.0 | Weak |
| 3.89 | Very Strong |
| 3.79 | Very Weak |
| 3.71 | Medium |
| 3.58 | Weak |
| 3.49 | Medium |
| 3.35 | Weak |
| 3.30 | Weak |
| 3.25 | Very Weak |
| 3.18 | Medium |
| 2.92 | Weak |
| 2.77 | Very Weak |
| 2.70 | Weak |
| 2.60 | Weak |
| 2.55 | Weak |

-continued

| Spacing d (Å) | Relative intensities |
|---|---|
| 2.45 | Very Weak |
| 2.42 | Medium |
| 2.36 | Very Weak |
| 2.34 | Weak |
| 2.29 | Weak |

2. A process for crystallization of monosodium citrate monohydrate which comprises subjecting to evaporation an aqueous solution containing monosodium citrate whilst maintaining said solution at a temperature between 20° and 60° centigrade and at a concentration of monosodium citrate of not less than 155 percent (weight/volume) of the saturation solubility of γ-crystals of monosodium citrate at that temperature.

3. A process for crystallization of monosodium citrate monohydrate according to claim 2, wherein the concentration of monosodium citrate is not over than 300 percent (weight/volume) of the saturation solubility of γ-crystals of monosodium citrate at that temperature.

4. A process for crystallization of monosodium citrate monohydrate according to claim 2, wherein, when the aqueous solution contains both monosodium citrate and monosodium (+) isocitrate, the crystallization velocity of monosodium citrate (g/l.—Hr) is controlled below maximum allowable crystallization velocity $Y$ as determined from the equation $$Y = 219,000 X^{-1.53}$$

in which $X$ is the concentration of monosodium (+) isocitrate in the solution.

* * * * *